United States Patent [19]

Yamada et al.

[11] 3,915,568

[45] Oct. 28, 1975

[54] OVERHEAD PROJECTOR

[75] Inventors: Isao Yamada; Satoshi Yamauchi, both of Tokyo, Japan

[73] Assignee: Kabushiki Kaisha Ricoh, Tokyo, Japan

[22] Filed: July 16, 1974

[21] Appl. No.: 489,007

[30] Foreign Application Priority Data
Aug. 3, 1973  Japan.............................. 48-87308

[52] U.S. Cl................................... 353/99; 353/38
[51] Int. Cl.²........................................ G03B 21/28
[58] Field of Search............ 353/38, 81, 85, 98, 99, 353/102

[56] References Cited
UNITED STATES PATENTS

| | | | |
|---|---|---|---|
| 1,842,855 | 1/1932 | Benard | 353/102 |
| 3,126,786 | 3/1964 | Appeldorn | 353/99 |
| 3,822,936 | 7/1974 | Troje et al. | 353/99 |

Primary Examiner—Richard E. Aegerter
Assistant Examiner—A. Jason Mirabito
Attorney, Agent, or Firm—Frank J. Jordan

[57] ABSTRACT

A truncated conical reflector reflects an annular image of a light source disposed therewithin through an annular-convex or circular-cylindrical lens, which may be a Fresnel lens, and through the slide being projected into a projection lens, which projects an image of the slide onto a screen.

5 Claims, 9 Drawing Figures

OVERHEAD PROJECTOR

The present invention relates to an overhead projector utilizing a truncated conical reflector and a circular-cylindrical lens to illuminate a slide being projected.

Overhead projectors have become increasingly popular in recent years in classrooms, conferences and the like to present teaching and reference material provided in the form of slides or translucent documents to a group. While overhead projectors presently in use are capable of projecting a reasonably sharp image with generally acceptable brightness, it is desired to improve these features to a level of full satisfaction.

Prior art attempts to increase the brightness of the projected image include increasing the luminous output of the projection lamp. This method, however, is not satisfactory because of an accompanying increase in the electric power required, and overheating and damage to the slide being projected and components such as Fresnel lenses in the projector. Another attempt involves reducing the distance between the projection lamp and the condenser lens, which may be a Fresnel lens, to increase the luminous flux incident on the condenser lens. This method is unacceptable both because of overheating of the condenser lens and irregularity in the illumination of the slide, with the periphery of the slide appearing darker than the center. Various optical distortions are also created which reduce the sharpness of the projected image.

It is therefore an object of the present invention to provide an overhead projector which overcomes the above described drawbacks of the prior art and projects a sharper and brighter image of a slide or document onto a viewing screen than prior art projectors.

It is another object of the present invention to provide a method of brightly and uniformly illuminating a document utilizing a conical or pyramidal reflector and a circular-cylindrical lens which can be used in known projectors of various types.

The above and other objects, features and advantages of the present invention will become clear from the following detailed description taken with the accompanying drawings, in which.

Figure 1:
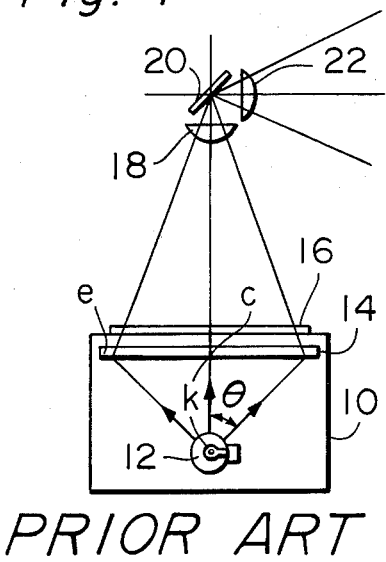
FIG. 1 is a schematic sectional elevation of a prior art overhead projector.

Referring now to FIG. 1, a typical prior art overhead projector includes a box 10 containing a light source in the form of a lamp 12. A Fresnel lens 14, which serves as a condenser lens, is arranged above the lamp 12 and a glass stage or frame 16 is arranged above the Fresnel lens 14 to support a document (not shown) being projected. The document may be in the form of a slide or transparency, or may be in translucent form such as a drawing on tracing paper. Arranged above the frame 16 is a projection lens assembly including a first lens 18, a plane mirror 20 and a second lens 22. The lens 18 focuses an image of the document on the frame 16 onto the mirror 20, which is oriented at substantially a 45° angle to the horizontal. The image is reflected from the mirror 20 and focussed by the lens 22 onto a vertical viewing surface such as projection screen (not shown). Preferably, the focal length of the Fresnel lens 14 is selected so that an image of the lamp 12 is focussed into the principal plane of the projection lens assembly.

Although this prior art projector is suitable for non-critical applications and is in widespread use, it is accompanied by a major drawback in that the outer or peripheral areas of the document receive less illumination than the central area. The reason for this can be understood in simple mathematical terms. It will be herein assumed that the luminous intensity of the lamp 12 is I, and the angle between the vertical and a line through an edge $e$ of the Fresnel lens 14 and the lamp 12 is $\theta$. The illuminance $E_c$ at the center c of the Fresnel lens 14 is $$E_c = I/h^2 \qquad (1)$$

and the illuminance $E_e$ at the edge e of the Fresnel lens 14 is $$E_e = I\cos^3\theta/h^2 \qquad (2)$$

Division of equation (2) by equation (1) gives the ratio of the illuminance $E_e$ at the edge e of the Fresnel lens 14 to the illuminance $E_c$ at the center $c$ of the Fresnel lens 14.

$$\frac{E_e}{E_c} = \cos^3\theta \qquad (3)$$

In a typical overhead projector of this type, the angle $\theta$ is about 45°. The ratio $E_e/E_c$ is then equal to $\cos^3(45°)$ or about 0.35.

In practice, it has been found that aberrations created by the Fresnel lens 14 and other factors further decrease the ratio $E_e/E_c$ down to about 0.20. It is easily understood that moving the lamp 12 closer to the Fresnel lens 14 will increase the angle $\theta$ and further decrease the ratio $E_e/E_c$, so that the edge $e$ will appear even darker compared to the center $c$. This would make it extremely difficult to view the projected image.

Figure 2:
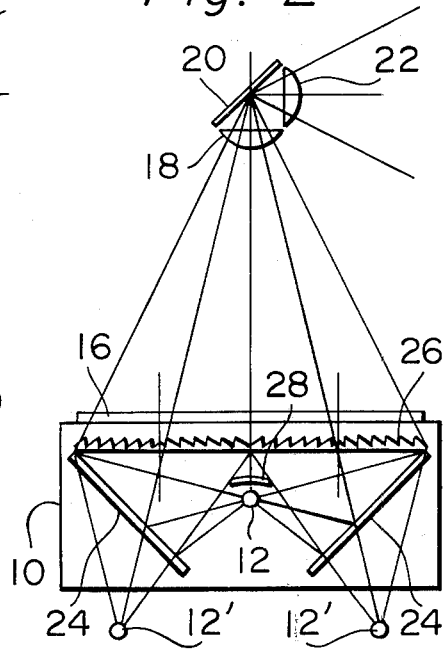
FIG. 2 is a similar to FIG. 1 but shows another prior art overhead projector.
Figure 3:
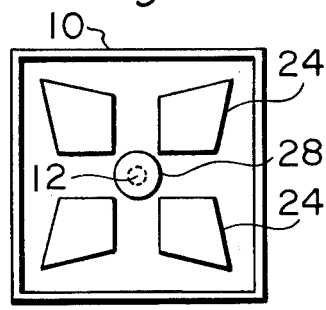
FIG. 3 is a top plan view of a part of the overhead projector shown in FIG. 2.
Figure 4:
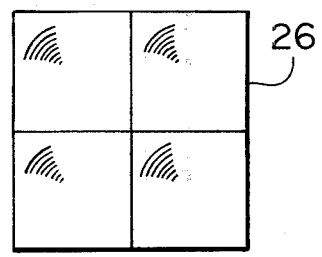
FIG. 4 shows a quandripartite Fresnel lens constituting part of the overhead projector shown in FIG. 2.

FIG. 2 shows an improvement over the projector of FIG. 1, in which like elements are designated by the same reference numerals. In FIG. 2, the Fresnel lens 14 has been replaced by a quadripartite Fresnel lens 26, which consists of four Fresnel lens elements joined together in a common plane as shown in FIG. 4. In addition, four mirrors 24 are disposed in the box 10 as shown in FIG. 3 to reflect an image of the lamp 12 through respective lens elements of the Fresnel lens 26. The focal length of the lens elements of the Fresnel lens is selected so that the four images of the lamp 12 are focussed by the respective lens elements into the principal plane of the projection lens assembly. A shield 28 is also provided to prevent light from the lamp 12 from being directly incident on the center of the Fresnel lens 26. Virtual images 12' are defined behind each of the mirrors 24 as shown.

The projector of FIG. 2 eliminates the drawbacks of the projector of FIG. 1 in that the light from the lamp 12 is satisfactorily evenly distributed over the surface of the document or slide in the frame 16. However, other aberrations are introduced by the Fresnel lens 26 itself which detract from the desirability of the projector.

For example, since lines of demarcation are unavoidable between the lens elements of the Fresnel lens 26, images of these lines will be projected onto the screen superimposed on the image of the document. Also, coma and astigmatism will be introduced due to the angle of incidence of the images reflected through the Fresnel lens 26 by the mirrors 24. In addition, objectionable irregularity of illumination will be produced due to refraction and other phenomenon occuring at the interfaces between the lens elements of the Fresnel lens 26.

Figure 5:
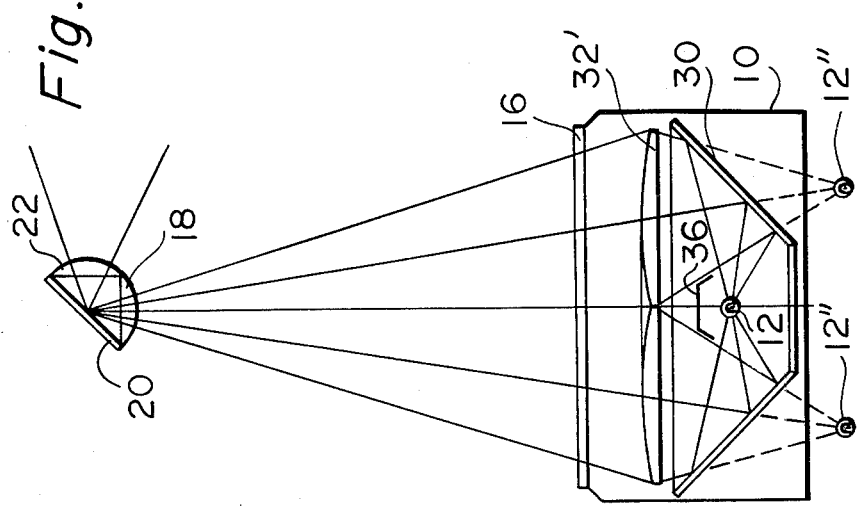
FIG. 5 is a schematic sectional elevation of a preferred embodiment of an overhead projector according to the present invention.

FIG. 5 shows an embodiment of the present invention adapted to overcome the drawbacks of the prior art overhead projectors described hereinabove. Like elements are designated by the same reference numerals, and it will be noticed that the novel aspects of the invention are embodied in the system for illuminating the document or slide.

In FIG. 5, a mirror or reflector 30 is provided in the form of a truncated cone as shown having its base oriented upward and having an internal reflecting surface. If desired, the reflector 30 may alternatively be in the form of a truncated pyramid, preferably having a large number of faces in order to approximate a cone, although this modification is not shown. An annular-convex or circular-cylindrical lens 32 is arranged above and parallel to the base of the reflector 30, which will be described in detail below. A convex lens 34 is arranged above and parallel to the circular-cylindrical lens 32, and the document (not shown) is adapted to be placed on top of the glass frame 16 as in the previously described projectors. The projection lens assembly is also similar to that described above. A shield 36 is provided to prevent light from the lamp 12 from being directly incident on the center of the circular-cylindrical lens 32.

The annular-convex or circular-cylindrical lens 32 itself can be conceptualized as a solid of revolution formed by rotating the cross section of a conventional convex lens about a line parallel to the central axis of the cross section which passes through a point on the circumference of the cross section. Said line then becomes the central axis of the generated lens 32, and the central axis of the cross section is generated into a right circular cylinder formed about the central axis of the lens 32. The generated solid or lens 32 has the overall shape of an annulus, here shown as being without a central hole. Although the lens 32 shown is formed from a plano-convex cross section and does not have a central hole, it can be formed from any cross section adapted to converge light rays passing therethrough. In addition, said line may be spaced outward of the circumference of the cross section so that the generated solid or lens 32 has a central hole, by which the lens 32 can be coveniently mounted on the shield 36. It will be understood that the conical reflector 30 and the lens 32 form a circular image of an object point, and that in the arrangement shown, said line constituting the central axis of the circular-cylindrical lens 32 is co-linear with the axis of the conical reflector 30 so that a circular image of the lamp 12 is focussed into the principal plane of the projection lens assembly. A circular virtual image 12'' is defined behind the reflector 30 as shown.

More specifically, the focal length $f_1$ of the circular-cylindrical lens 32 is selected to coincide with the distance between the virtual image 12'' and the principal plane of the circular-cylindrical lens 32, and the focal length $f_2$ of the convex lens 34 is selected to coincide with the distance between the principal planes of the convex lens 34 and the first lens 18 of the projection lens assembly. With this system, since the image of the lamp 12 produced by the conical reflector 30 and the circular-cylindrical lens 32 is circular and continuous, the illumination of the document is extremely uniform from the center of the document to its periphery, and the problems with the interfaces between lens elements inherent in FIG. 2 projector are not present. Also, due to the circular image of the light source 12, the brightness of illumination of the document is increased, and optical aberrations are reduced.

Figure 6:
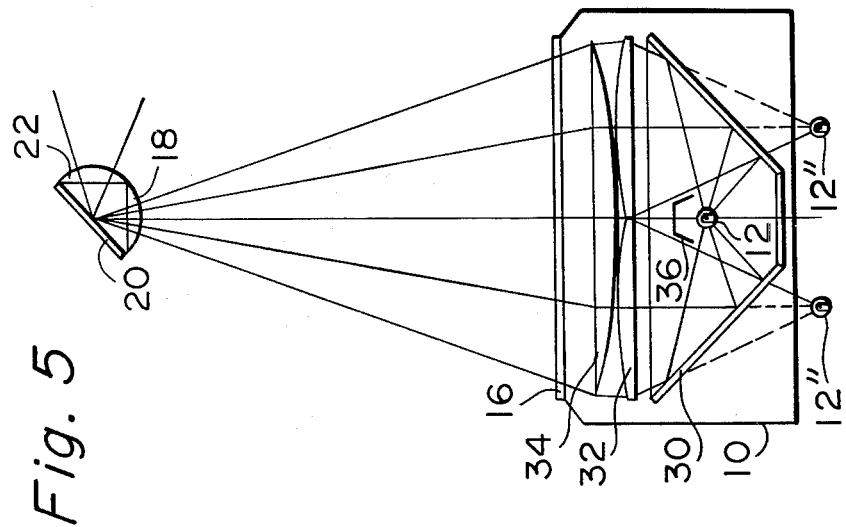
FIG. 6 is similar to FIG. 5, but shows a modification thereof.

If desired, the convex lens 34 may be omitted as shown in the embodiment of FIG. 6. In this case, the focal length $f_3$ of a modified circular-cylindrical lens 32' is $$f_3 = \frac{1}{1/a + 1/b} \tag{4}$$

where $a$ is the distance from the virtual image 12'' to the lens 32' and $b$ is the distance from the lens 32' to the lens 18, whereby the circular image of the lamp 12 is focussed into the principal plane of the lens 18.

Figure 7A:
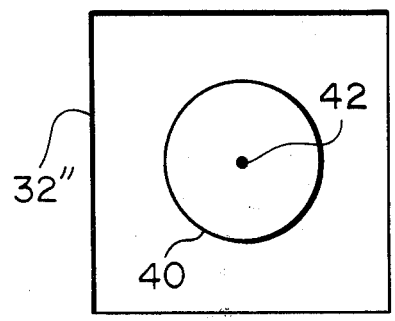
FIGS. 7a, 7b and 7c illustrate a circular-cylindrical Fresnel lens constituting a modification of a part of the overhead projector shown in FIGS. 5 or 6.
Figure 7B:
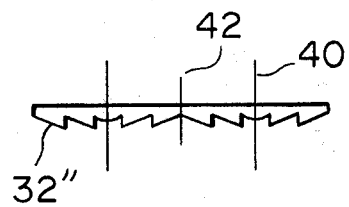
Figure 7C:
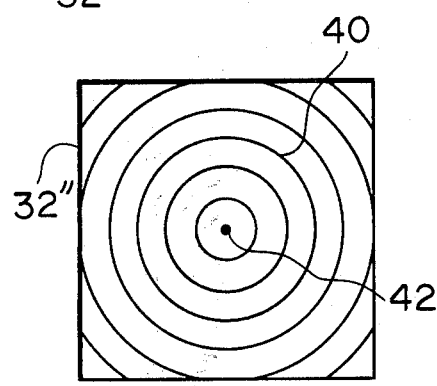

If desired, the circular-cylindrical lens 32 or 32' may be replaced with an equivalent Fresnel lens 32'', as shown in FIGS. 7a, 7b and 7c. Here, the cylinder generated by revolving the central axis of the cross section about said line is indicated by the reference numeral 40, and said line is indicated by the numeral 42. The Fresnel lens 32'' provides performance equivalent to the lens 32 or the lens 32', and is cheaper to manufacture on a mass production basis. If desired, the convex lens 34 may be replaced by a Fresnel lens of conventional design and the same focal length.

Although the present invention has been shown and described herein as being in the form of an overhead projector, it must be understood that the scope of the present invention is not so limited. For example, the novel features of the present invention may be applied to a horizontal projector in which the frame 16 is modified to securely clamp the document in a vertical position. In this case, the mirror 20 and lens 22 are omitted, and the focal length of the lens 18 is selected to project an image of the document onto a screen arranged substantially perpendicular to the axis of the conical reflector 30 and lens 32. The lens 18 may naturally be replaced by a suitable projection lens assembly arranged for straight line projection which comprises more than one lens.

What is claimed is:
1. An overhead projector comprising:
   a frame for supporting a document being projected;
   a truncated conical reflector having an internal reflector surface, the base of said conical reflector being arranged to face said frame;
   a light source disposed within said conical reflector on the axis thereof;
   projection lens means spaced from said frame and arranged to project an image of the document onto a viewing surface;

a circular-cylindrical lens disposed between the base of said conical reflector and said frame with the axis of said conical reflector perpendicularly passing through the center of said circular-cylindrical lens to focus an image of said light source into said projection lens means; and a converging lens disposed between said circular-cylindrical lens and said frame, whereby the document is illuminated by light radiated by the light source, reflected by the conical reflector and refracted by the circular-cylindrical lens and the converging lens, and the image of the document is projected onto the viewing surface by the projection lens means.

2. An overhead projector according to claim 1, in which both the circular-cylindrical lens and the converging lens are Fresnel lenses.

3. An overhead projector according to claim 2, in which the axis of said conical reflector and the viewing surface are arranged vertically, the document is arranged horizontally, and said projection lens means is arranged to project the image of the document substantially vertically onto the viewing surface.

4. In an overhead projector having a frame for supporting a document being projected and projection lens means arranged to project an image of the document onto a viewing surface, the improvement of an illumination system for illuminating the side of the document opposite to the side facing the projection lens means, said illumination system comprising:

a truncated conical reflector having an internal reflector surface, the base of said conical reflector being arranged to face the frame;

a light source disposed within said conical reflector on the axis thereof;

a circular-cylindrical lens disposed between the base of said conical reflector and the frame with the axis of said conical reflector perpendicularly passing through the center of said circular-cylindrical lens to focus an image of said light source into said projection lens means; and a converging lens disposed between said circular-cylindrical lens and the frame, whereby the document is illuminated by light radiated by said light source, reflected by said conical reflector and refracted by said circular-cylindrical lens and the converging lens.

5. The improvement according to claim 4, in which both the circular-cylindrical lens and the converging lens are Fresnel lenses.

* * * * *